Nov. 10, 1959   J. TURTIL   2,912,632
MOTOR REVERSING AND DYNAMIC BRAKING CIRCUIT
Filed Aug. 23, 1957
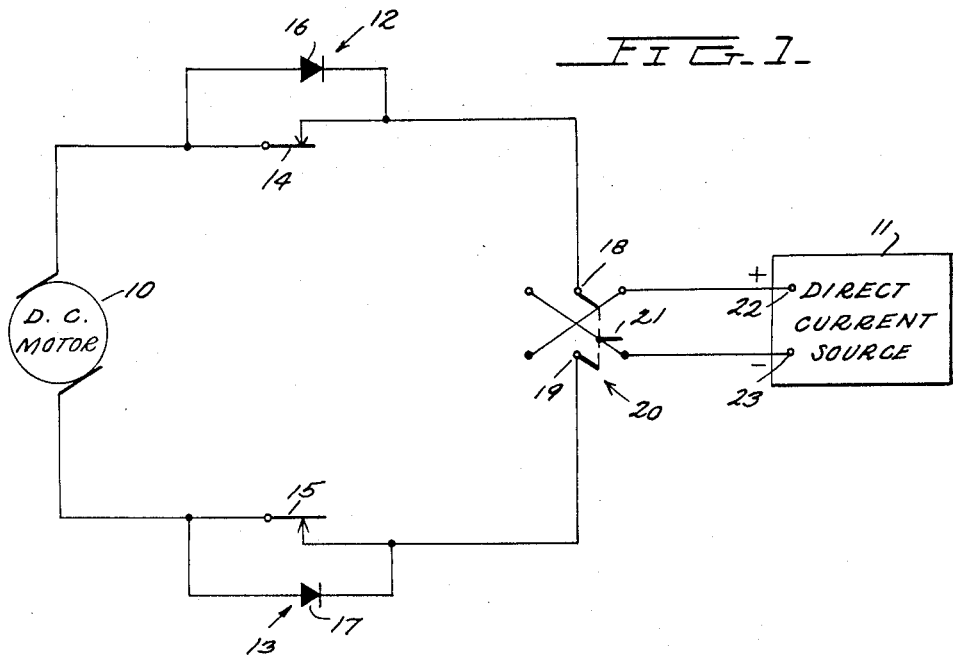
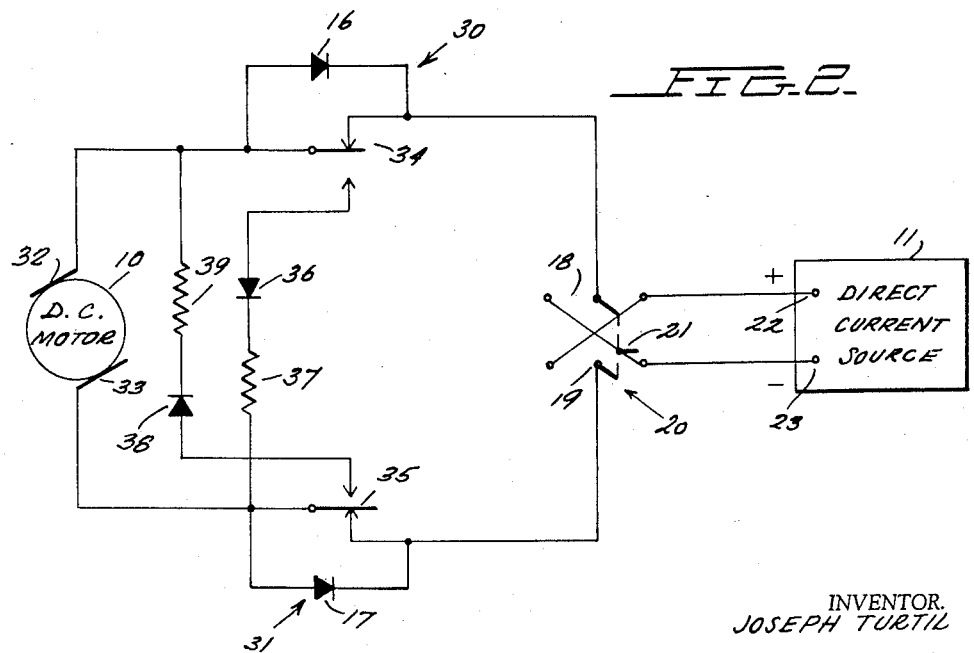
INVENTOR.
JOSEPH TURTIL
BY Ostrolenk, Faber,
Gerb & Soffen
ATTORNEYS

United States Patent Office 2,912,632
Patented Nov. 10, 1959

2,912,632

MOTOR REVERSING AND DYNAMIC BRAKING CIRCUIT

Joseph Turtil, Levittown, Pa., assignor to I-T-E Circuit Breaker Company, Philadelphia, Pa., a corporation of Pennsylvania Application August 23, 1957, Serial No. 679,981

4 Claims. (Cl. 318—261)

This instant invention relates to a simplified circuit arrangement whereby a D.C. motor may be automatically stopped upon reaching a given position and thereafter driven in the reverse direction only after receiving a command signal. More particularly this circuit arrangement utilizes the switching action of diodes in conjunction with microswitches thereby eliminating costly relays and the circuitry associated therewith which characterized most prior art arrangements for achieving the functions hereinbefore stated.

One prior art unidirectional end stop arrangement utilized a latching relay which simultaneously stopped the motor and switch circuitry to reverse the drive when a first stop was contacted. It was then necessary to drive the motor in reverse to a second stop before the motor could be driven back to the first stop unless more complicated switching circuits were included.

Another arrangement utilized a servo system or other direction sensing means wherein the drive would reach the limit switch, back off a short distance, then run into the limit switch again. This would continue until the error signal was reversed. Still another prior are arrangement utilized a costly special motor having split series field.

In the instant invention two diodes are arranged in back to back relationships, or blocking polarity, in series with a D.C. motor. Each diode is paralleled by a normally closed stop switch. When the motor drives forward into one of the stop switches to open it, the motor stops since the diode associated with the open switch is oriented so as not to pass current in a direction which will drive the motor forward.

Upon a command signal with the polarities between the circuit and the power source reversed, the diode in parallel with the open stop switch will pass current until its paralleling stop switch is closed and thereby permit the motor to be driven in reverse until such time as the circuit polarities are again reversed or the other stop switch is opened. When the other stop switch is open, the diode associated therewith operates in the same manner as did the other diode when its associated stop switch was opened. With this arrangement the motor may be driven in either direction, at will, when both stop switches are closed.

It is to be noted that the diodes are required to carry current for only a very short time, that is, only during the interval that the motor is backing off to permit an open stop switch to close. At all other times the diodes are either shorted by the closed switches or the polarities between the power source and circuit are such that the diode need merely act as a blocking device.

The instant invention further contemplates the utilization of diodes in series with resistors for dynamic braking purposes with the diodes being connected so as to prevent loading of the voltage source during the short interval when the motor is backing away from a stop switch.

Accordingly, a primary object of the instant invention is to provide a circuit arrangement utilizing the switching action of diodes to effect the automatic stopping of a D.C. motor and its subsequent reversal upon the reversal of circuit polarity, thereby eliminating switching relays and complicated circuitry characteristic of the prior art devices.

Another object is to provide a circuit arrangement utilizing the switching action of diodes to effect automatic stopping of a D.C. motor and also including provisions for dynamic braking thereof.

Still another object is to provide a circuit arrangement wherein two diodes and a D.C. motor are connected in series, the diodes being connected in blocking polarity with separate normally closed end stop switches being connected in parallel with each of the diodes.

A further object is to provide a circuit arrangement wherein a D.C. motor is automatically stopped in either of two extreme positions and the motor may be selectively reversed at any point between these two extreme positions.

These and other objects of the instant invention will become readily apparent after reading the following description of the accompanying drawings in which:

Figure 1 is a schematic of a circuit arrangement including unidirectional end stops.

Figure 2 is a schematic wherein dynamic braking means have been added to the circuit of Figure 1.

Referring more particularly to Figure 1, D.C. motor 10 is connected to D.C. power source 11 through the series connections of unidirectional end stops 12 and 13. Each unidirectional end stop 12, 13 comprises normally closed stop switches, usually microswitches, 14, 15 respectively paralleled by diodes 16, 17 respectively which are connected in blocking relationship. That is, diodes 16, 17 are connected so that current cannot flow from the power source 11 to the motor 10 through a series path which includes both diodes 16, 17.

The direction of rotation of motor 10 is determined by the polarity of the voltage appearing at switch terminals 18 and 19. This voltage is selectively changeable by means of reversing switch 20 which is a double pole double throw switch. When the operating handle 21 is thrown to the right, or forward position, motor terminals 18, 19 will be connected to the positive and negative terminals 22, 23 respectively of power source 11 causing motor 10 to rotate in a direction which will arbitrarily be referred to as forward.

Motor 10 may be driven forward to a forward limit point where stop switch 14 will be operatively engaged and thereby opened by motor 10. Now the only complete circuit from power source 11 to motor 10 must include diode 16. However, diode 16 is arranged in blocking relationship as respects the voltage polarity required to drive motor 10 forward. Since the forward current path is now effectively opened, motor 10 will stop.

By throwing operating handle 21 to the left or reverse position the voltage polarity appearing at switch terminals 18, 19 will be reversed and the polarity is such that diode 16 will pass current. Now there is a complete current path from power source positive terminal 22 through reversing switch terminal 19, closed stop switch 15, motor 10, diode 16, switch terminal 18, to the negative terminal 23 of power source 11 so that motor 10 will rotate in the reverse direction. It is to be noted that diode 16 will only be required to carry current during the short interval that motor 10 is being driven in reverse until stop switch 14 closes.

Motor 10 will run in reverse until such time as operating handle 21 is moved from its leftmost position or until motor 10 operatively engages, and thereby opens, stop switch 15 of unidirectional end stop 13. When stop switch 15 is open and operating handle 21 is in its reverse position diode 17 will block current flow so that motor 10 will automatically stop. By throwing operating handle 21 to the forward position switch output terminals 18, 19 are connected to the positive 22 and negative 23 terminals respectively of power source 11. Now the proper voltage polarity appears across diode 17 to enable it to pass current in the forward direction until such time as motor 10 becomes disengaged from stop switch 15 and diode 17 is once again shorted out.

Thus, motor 10 may be selectively operated in the forward and reverse directions by merely operating reversing switch 20 with the limits of forward and reverse travel being limited by the engagement of motor 10 with stop switches 14, 15. All relays and associated switching circuits have been eliminated. Motor 10 may be selectively stopped at any point intermediate stop switches 14, 15 by merely moving operating handle 21 to an intermediate point between its forward and reverse positions.

The circuit of Figure 2 is a modification of the circuit of Figure 1 with provisions for dynamic braking of motor 10 being included. For the sake of simplicity, where elements of Figure 2 are identical to those of Figure 1, the same reference numerals have been retained.

Unidirectional end stops 30, 31 are connected to motor terminals 32, 33 respectively to form a series circuit between switch terminals 18, 19. Each unidirectional end stop 30, 31 comprises a stop switch 34, 35 which are single pole double throw switches biased to an operating position wherein stop switches 34, 35 short circuit diodes 16, 17 respectively.

When operating handle 21 is thrown to the right D.C. motor 10 rotates forward until stop switch 34 is engaged and thereby operated against its bias to a second position wherein a series circuit, comprising diode 36 and a low value of resistance 37, is connected across motor terminals 32, 33. With stop switch 34 in its second position and operating handle 21 in its forward position diode 16 prevents current from flowing between power source 11 and motor 10. At this time rotating motor 10 acts as a generator with terminal 32 being positive and terminal 33 being negative so that current will flow through diode 36 and braking resistor 37 to load the generator and act as a dynamaic brake to stop rotation of the motor in a short time after stop switch 34 is moved to its second position.

Thereafter throwing operating handle 21 to the left will apply voltage of a negative polarity to motor terminal 32 and a positive polarity to motor terminal 33. With this polarity present diode 36 prevents current flow from power source 11 through the low value of resistance 37 used for dynamic braking purposes. However, at this time diode 16 is arranged to pass current and will continue to do so until motor 10 backs off a sufficient distance to permit stop switch 34 to assume its normal position wherein diode 16 is shorted.

Motor 10 will continue to run in reverse as long as operating handle 21 is in the left position. At a predetermined point in its reverse rotation, motor 10 will operatively engage stop switch 35 of unidirectional end stop 31 thereby moving stop switch 35 against its bias to a second position wherein diode 38 and braking resistor 39 are connected in series across motor terminals 32, 33 to provide dynamic braking as did diode 36 and resistor 37 for forward rotation of motor 10.

When stop switch 35 is in its second position, diodes 17, 38 function in the same manner as did diodes 16, 36 respectively when stop switch 34 was in its second position. In this way motor is so dynamically braked automatically upon reaching either of its extreme rotative positions. Further, motor 10 will only reverse its direction of rotation upon a command signal, such as the operation of reversing switch 20.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. The combination comprising an electrical series connection of a rotatable D.C. motor, a first and a second unidirectional end stop; each of said unidirectional end stops including a diode and a switch in parallel therewith; the diodes of each of said unidirectional end stops being connected in blocking relationship; said motor being operatively engageable with the switch of the first unidirectional end stop by rotation in a first direction and operatively engageable with the switch of the second unidirectional end stop by rotation in a second direction; said motor being automatically stopped upon operative engagement with said switches of said first and second unidirectional end stops and thereafter rotatable out of engagement only by rotation in a direction opposite to the direction of rotation just prior to engagement; each of said diodes being shorted by its associated switch except when its associated switch is operatively engaged by said motor; a first and a second means each connectable in parallel with said motor; each of said means comprising the series connection of a diode and a resistor; said first means being in parallel with said motor when the switch of the first unidirectional end stop is engaged by said motor; said second means being insertable in parallel with said motor when the switch of the second unidirectional end stop is engaged.

2. The combination comprising an electrical series connection of a rotatable D.C. motor, a first and a second unidirectional end stop; each of said unidirectional end stops including a diode and a switch in parallel therewith; the diodes of each of said unidirectional end stops being connected in blocking relationship; said motor being operatively engageable with the switch of the first unidirectional end stop by rotation in a first direction and operatively engageable with the switch of the second unidirectional end stop by rotation in a second direction; said motor being automatically stopped upon operative engagement with said switches of said first and second unidirectional end stops and thereafter rotatable out of engagement only by rotation in a direction opposite to the direction of rotation just prior to engagement; each of said diodes being shorted by its associated switch except when its associated switch is operatively engaged by said motor; a first and a second means each connectable in parallel with said motor; each of said means comprising the series connection of a diode and a resistor; said first means being in parallel with said motor when the switch of the first unidirectional end stop is engaged by said motor; said second means being insertable in parallel with said motor when the switch of the second unidirectional end stop is engaged; the diodes of each of said means being arranged to block current flow through their associated resistors from a D.C. source which supplies energy to rotate said motor.

3. The combination comprising an electrical series connection of a D.C. motor, a first and a second stop means; said first stop means comprising a first diode and a first switch; said second means comprising a second diode and a second switch; each of said switches normally in a first position wherein its associated diode is shorted; said motor being rotatable in a first direction when a power source of a first polarity is connected to said series connection; said motor being engageable with said first switch by rotation in said first direction and when so engaged effective to operate said first switch to a second position; said first diode being arranged to block current flow when said first polarity is connected to said series connection; said motor being rotatable in a second direction when a power source of a second polarity is connected to said series connection; said motor being operatively engageable with said second switch and when so engaged effective to operate said second switch to a second position; said second diode being arranged to block current when said second polarity is connected to said series connection; said first stop means being electrically connected to a first terminal of said motor and said second stop means being electrically connected to a second terminal of said motor; a first dynamic braking means comprising a third diode and a first resistor in series therewith; a second dynamic braking means comprising a fourth diode and a second resistor in series therewith; said first dynamic braking means being connected to said second terminal and connectable to said first terminal by operation of said first switch to its second position; said third diode arranged to block current flow from said power source of said second polarity through said first resistor; said second dynamic braking means being connected to said first terminal and connectable to said second terminal by operation of said second switch to its second position; said fourth diode arranged to block current flow from said power source of said first polarity through said second resistor.

4. A D.C. motor rotatable in a first direction when connected to a power source of a first polarity and rotatable in a second direction when connected to a power source of a second polarity opposite to said first polarity; a parallel combination comprising a normally closed first switch and a first diode, connected between a first terminal of said motor and a power source; a dynamic braking means comprising a series combination including a second diode and a normally open second switch connected between a second terminal of said motor and said first terminal; said second switch being open when said first switch is closed and being closed when said first switch is open; said motor when rotated in said first direction to a predetermined position engaging said first and said second switches for operation thereof to their open and closed positions, respectively; said first diode being operatively arranged to block current flow to said motor from a power source of said first polarity when said first switch is open; said second diode being operatively arranged to block current flow from a power source of said second polarity when said second switch is closed.

References Cited in the file of this patent

UNITED STATES PATENTS

| | | |
|---|---|---|
| 2,397,557 | McCoy | Apr. 2, 1946 |
| 2,755,423 | Hager | July 17, 1956 |